Patented May 29, 1945

2,377,029

UNITED STATES PATENT OFFICE 2,377,029

STABILIZATION OF FAT PRODUCTS

Frank A. Norris, Minneapolis, Minn., assignor to General Mills, Inc., a corporation of Delaware No Drawing. Application November 22, 1943, Serial No. 511,373

9 Claims. (Cl. 99—163)

The present invention relates to a process of stabilizing fatty food products such as oils, shortenings, salad dressings, spreads, and the like. The present application is a continuation in part of my co-pending application Serial No. 488,277, filed May 24, 1943.

In the above application it has been shown that a synergistic antioxidant effect is obtained by the conjoint use of p-amino-benzoic acid (the antigrey hair vitamin) and substances having the ene-diol grouping

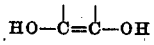

such as vitamin C, 1-ascorbic acid. While vitamin C, which is water soluble, has been known to have antioxidant effects in aqueous media, it has not been particularly effective in fats probably because of its insolubility. Likewise p-amino-benzoic acid by itself has not demonstrated any appreciable antioxidant effect in fats. When these two compounds are used together, however, they exhibit a pronounced synergistic effect which gives the product a stability far in excess of that of the untreated product. This is demonstrated by the following table showing the effect on rendered pork fat:

Table I

| Sample | "Swift" stability hours |
|---|---|
| 1. Rendered pork fat | 2¼ |
| 2. (1)+0.1% p-amino benzoic acid | 2¾ |
| 3. (1)+0.1% 1-ascorbic acid | 11½ |
| 4. (2)+0.1% 1-ascorbic acid | 60 |

In place of 1-ascorbic acid other compounds having the ene-diol grouping, such as reductone, dihydroxymaleic acid, analogues or isomers of ascorbic acid, such as iso-ascorbic acid, gluco-ascorbic, araboascorbic, etc., may be used.

It has now been discovered that a multiple synergistic effect is obtained by the combined use of tocopherol, p-amino-benzoic acid, and a compound having the ene-diol grouping $$HO-\overset{|}{C}=\overset{|}{C}-OH$$

This is demonstrated by the following data:

Table II

| Sample | "Swift" stability hours |
|---|---|
| 1. Rendered pork fat | 2¼ |
| 2. (1)+0.02% tocopherol | 13½ |
| 3. (1)+0.10% ascorbic acid | .11½ |
| 4. (1)+0.10% p-amino benzoic acid | 2½ |
| 5. (1)+0.02% tocopherol+0.10% ascorbic acid | 400 |
| 6. (1)+0.02% tocopherol+0.10% p-amino benzoic acid | 16½ |
| 7. (1)+0.10% p-amino benzoic acid+0.10% ascorbic acid | 107 |
| 8. (1)+0.10% p-amino benzoic acid+0.10% ascorbic acid+0.02% tocopherol | 640 |

The rendered pork fat employed was the article available on the market, and it was used in these tests without any additional purification. Hydrogenation of this impure material results in a decided increase in stability. The material employed for these tests, however, was not hydrogenated in view of the fact that even without this treatment the time required for some of the tests was prolonged for weeks because of the high stabilities. It will be apparent, however, that the process may be employed on other materials having originally higher stabilities, in which case it may be desirable to reduce the amount of antioxidant added.

It is desired to point out that an apparent discrepancy exists between sample 4 in Table I and sample 7 in Table II, both of which samples are composed of rendered pork fat of the same original stability to which 0.1% p-amino-benzoic acid and 0.1% 1-ascorbic acid have been added. In the sample in Table I, the ingredients were merely weighed out and mixed together in an ordinary manner. In the sample in Table II the p-amino-benzoic acid and the 1-ascorbic acid were thoroughly ground together in a mortar and the resultant mixture was ground with a small portion of rendered pork fat to effect an intimate suspension. It is believed that this intimate distribution of the antioxidant constituents is responsible for the increased stability found.

In addition to its effect on the antioxidant properties of the product, p-amino benzoic acid has been found to have a decided preservative action and represses microbiological growth. The common materials employed to inhibit oxidative rancidity in fats have no effect on microbiological growth. Consequently yeast, molds, and the like, continue to grow and produce hydrolytic or other enzymic changes which result in rancidity. Thus, while the rancidity so produced is a distinct disadvantage in itself, the presence of large numbers of microorganisms is an even greater disadvantage in view of the possible ill effect on those who consume such a product.

It is apparent that these various objections to the prior art are overcome by the present invention in that it inhibits both oxidative rancidity and microbiological growth; obviously hydrolytic and enzymic rancidity normally accompanying microbiological growth is likewise inhibited. These results are produced by means of substances which are recognized vitamins and which, therefore, perform additional functions when consumed. Therefore, there should be no objection to the use of these substances from the standpoint of the food and drug authorities, as each of these substances is found widely distributed in ordinary food products.

While particular reference has been made to the use of vitamin C as the compound having the ene-diol grouping, other compounds having this grouping, such as those previously referred to, may also be used.

While the above disclosed quantities of antioxidant have been found to produce desirable results, it will be appreciated that the amount of each compound employed may be varied widely depending on the particular results desired. Likewise the invention is not limited to the fatty products specifically disclosed but may be employed on any product containing a substantial amount of fat subject to rancidity whether of an edible nature or not, all of which products are contemplated by the term "fatty product" as used in the appended claims.

I claim as my invention:

1. A fatty product containing, and being stabilized against the development of rancidity by, p-amino benzoic acid and a compound having the ene-diol grouping.

2. An edible fatty product containing and being stabilized against the development of rancidity by, p-amino benzoic acid and a compound having the ene-diol grouping.

3. An edible fatty product containing and being stabilized against the development of rancidity by, p-amino benzoic acid and 1-ascorbic acid.

4. A process of stabilizing fatty products which comprises incorporating therein p-amino benzoic acid and a compound having the ene-diol grouping.

5. A process of stabilizing edible fatty products which comprises incorporating therein p-amino benzoic acid and a compound having the ene-diol grouping.

6. A process of stabilizing edible fatty products which comprises incorporating therein p-amino-benzoic acid and 1-ascorbic acid.

7. A fatty product containing, and being stabilized against the development of rancidity by, not substantially in excess of 0.1% of each of p-amino benzoic acid and a compound having the ene-diol grouping.

8. An edible fatty product containing, and being stabilized against the development of rancidity by, not substantially in excess of 0.1% of each of p-amino benzoic acid and a compound having the ene-diol grouping.

9. An edible fatty product containing, and being stabilized against the development of rancidity by, not substantially in excess of 0.1% of each of p-amino benzoic acid and 1-ascorbic acid.

FRANK A. NORRIS.